(12) United States Patent
Rodgers

(10) Patent No.: US 7,845,664 B2
(45) Date of Patent: Dec. 7, 2010

(54) RECUMBENT TRAILER CYCLE

(76) Inventor: Stephan M Rodgers, 2748 Star Creek Dr., Broomfield, CO (US) 80020

( * ) Notice: Subject to any disclaimer, the term of this patent is extended or adjusted under 35 U.S.C. 154(b) by 200 days.

(21) Appl. No.: 12/234,405

(22) Filed: Sep. 19, 2008

(65) Prior Publication Data

US 2009/0079158 A1  Mar. 26, 2009

Related U.S. Application Data

(60) Provisional application No. 60/994,800, filed on Sep. 21, 2007.

(51) Int. Cl.
*B62K 27/00* (2006.01)
(52) U.S. Cl. .................... 280/204; 280/205; 280/239
(58) Field of Classification Search .................. 280/204, 280/205, 239
See application file for complete search history.

(56) References Cited

U.S. PATENT DOCUMENTS

| | | | | |
|---|---|---|---|---|
| 4,909,522 A | * | 3/1990 | Flanigan | 297/215.1 |
| 5,067,738 A | * | 11/1991 | O'Connor | 280/204 |
| 5,076,600 A | | 12/1991 | Fake | |
| 5,269,548 A | | 12/1993 | Milligan | |
| 5,470,088 A | * | 11/1995 | Adams | 280/204 |
| 5,641,173 A | * | 6/1997 | Cobb, Jr. | 280/204 |
| 5,716,065 A | * | 2/1998 | Liu | 280/204 |
| 5,743,543 A | * | 4/1998 | Chiu | 280/231 |
| 5,785,335 A | * | 7/1998 | George | 280/204 |
| 5,836,600 A | * | 11/1998 | Chiu | 280/231 |
| 5,842,710 A | * | 12/1998 | Couture | 280/204 |
| 6,341,791 B1 | * | 1/2002 | Cannon, Sr. | 280/204 |
| 6,561,533 B2 | * | 5/2003 | Snobl | 280/204 |
| 6,796,575 B2 | * | 9/2004 | Humes | 280/503 |

* cited by examiner

*Primary Examiner*—Kevin Hurley
(74) *Attorney, Agent, or Firm*—Leyendecker and Lemire LLC; Kurt Leyendecker

(57) ABSTRACT

Embodiments of the present invention comprise a single-wheeled recumbent bicycle trailer which may be attached to a bicycle, for transport of a passenger or passengers, wherein the passengers may contribute to propulsion of the combined cycle. The embodiments include a recumbent seat position and other accommodations for the safety and comfort of passenger(s) and ease of use. Such accommodations may include single or multi-passenger configuration, passenger pedals, hands-free operation for passengers, supportive seats with backrests, extendable leg rests, and safety restraints.

15 Claims, 10 Drawing Sheets

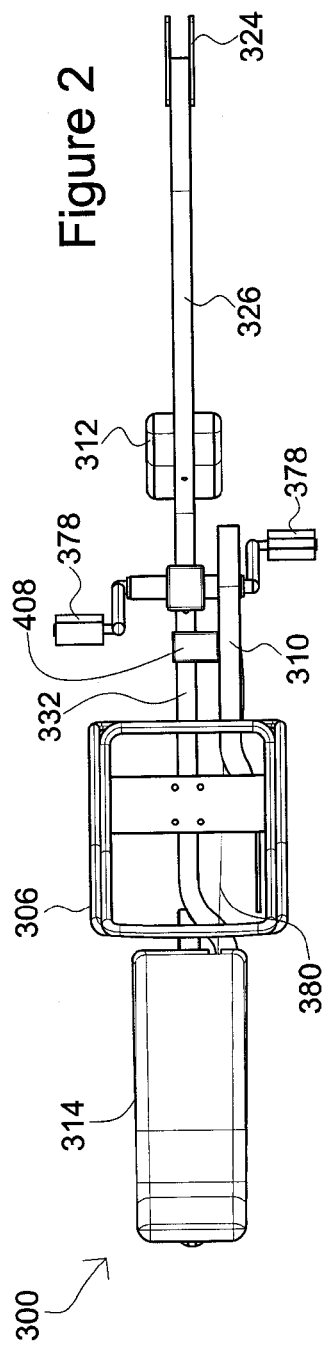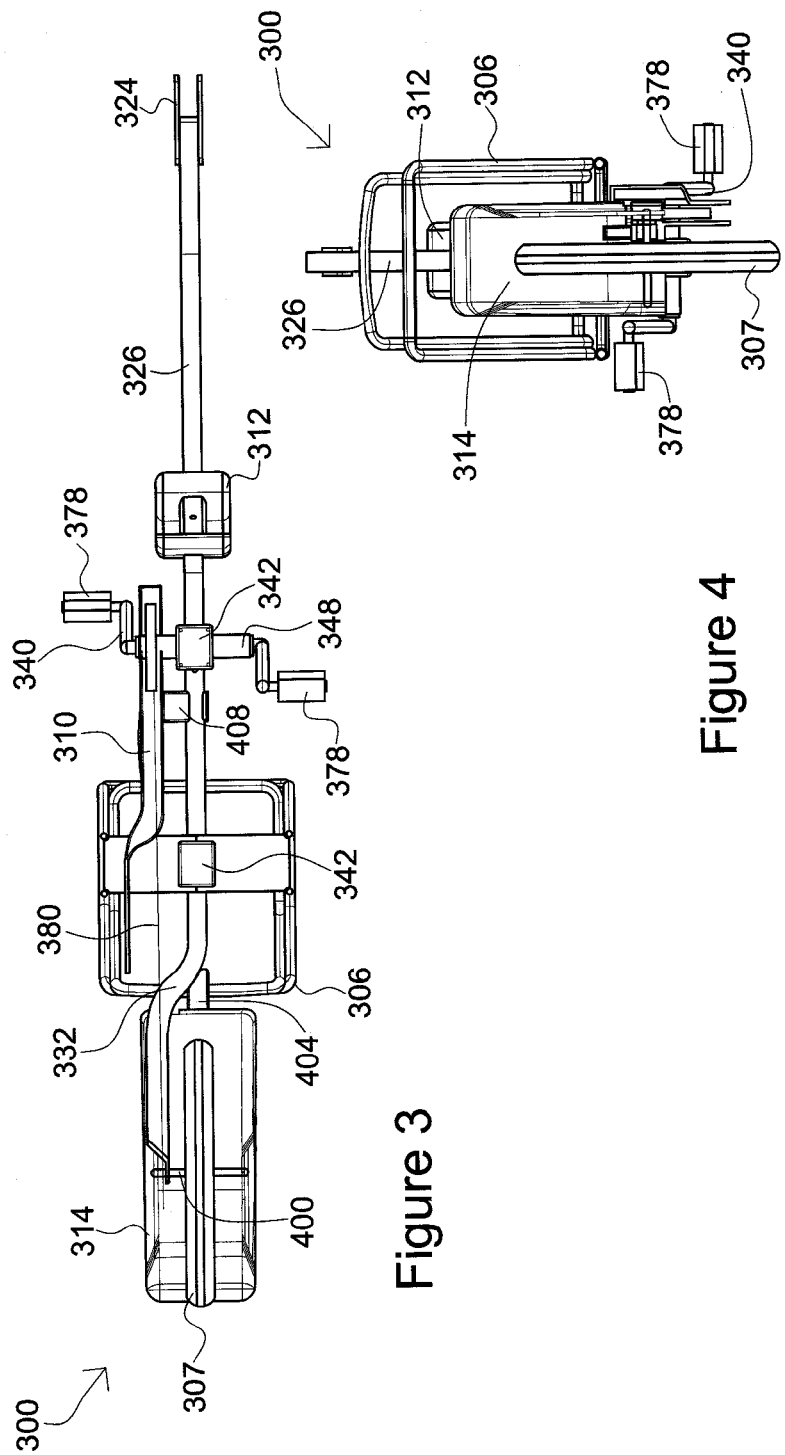

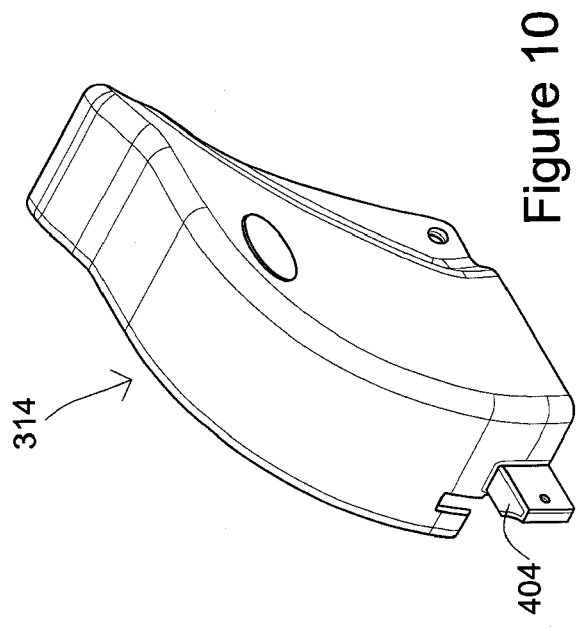
Figure 10
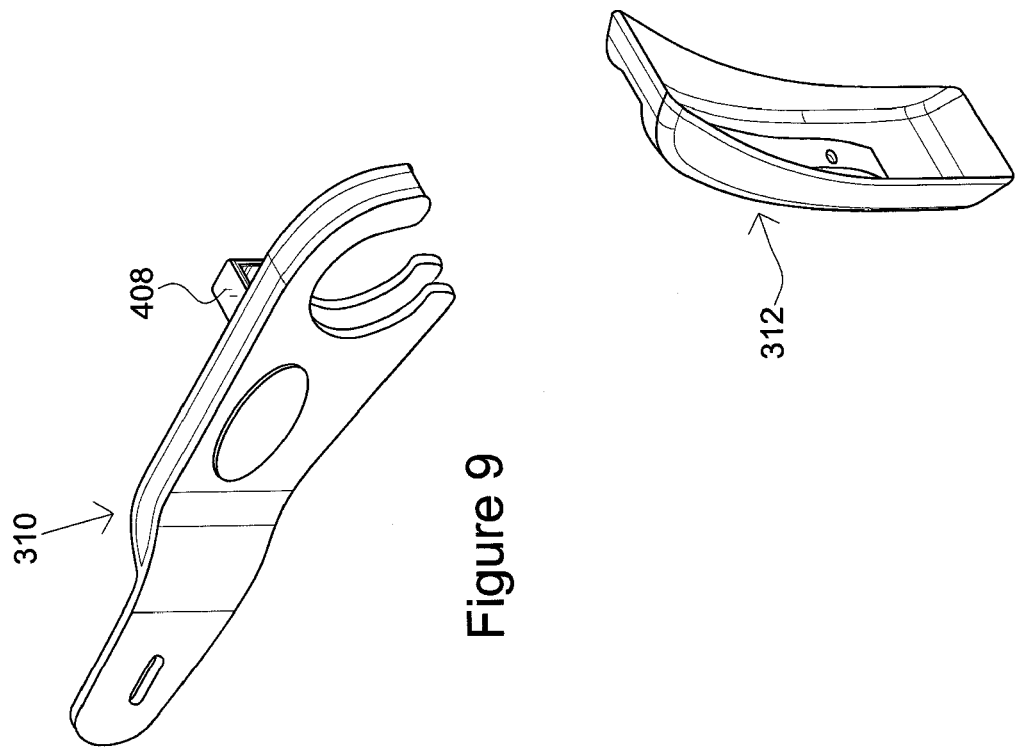
Figure 11
Figure 9

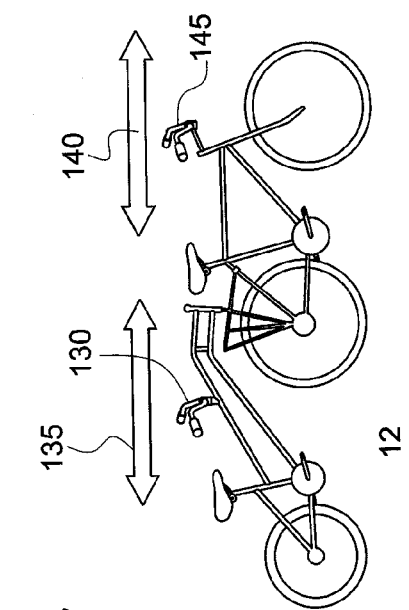
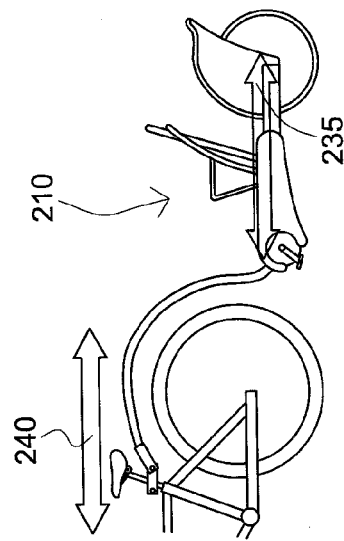
Figure 12
(Prior Art)
Figure 13
(Prior Art)
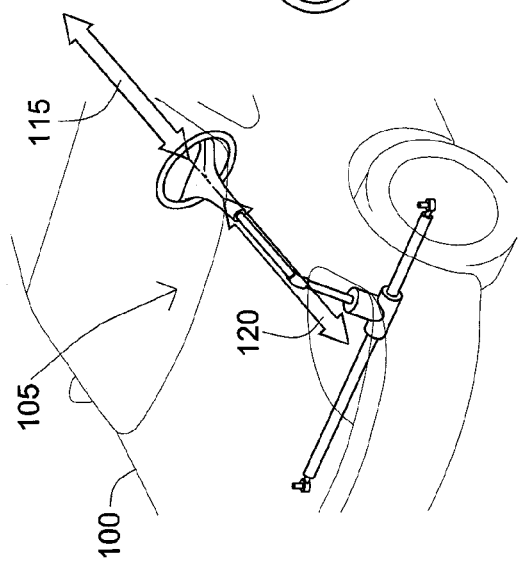
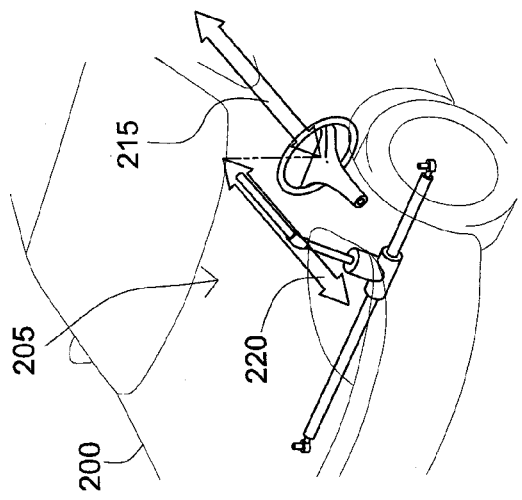

RECUMBENT TRAILER CYCLE

CROSS REFERENCE TO RELATED APPLICATIONS

This application claims priority from U.S. application No. 60/994,800 filed on Sep. 21, 2007, by Stephen M. Rodgers, which is incorporated herein by reference.

FIELD OF INVENTION

The present invention pertains to bicycle trailers adapted to carry one or more persons.

BACKGROUND

Bicycles are more popular than ever as both a means of exercise and with seemingly ever increasing gas prices, as an energy efficient means of transportation. One of the biggest problems with bicycle transportation is that it is typically limited to transporting a single person. This can be especially problematic for families wherein a mother and/or father may want to cycle to the store or get some exercise but she/he cannot because she/he is watching the child or children. With very young children, a child bicycle seat can often be utilized wherein the seat is bolted to the bicycle behind the cyclist; however, these types of seats are only suitable for very small children as the center of gravity of the bicycle, cyclist and child is raised as the weight of the child increases negatively impacting the bicycles stability. Also known in the art are various types of bicycle trailers that have one or more wheels and are pulled behind a bicycle. Each of the known types of trailers suffers from one or more deficiencies that have negatively impacted its acceptance in the marketplace.

In describing both prior art bicycle trailers and embodiments of the present invention, the following terminology will be utilized: (a) towing bicycle will be referred to as the "tow cycle"; (b) an adult, or rider, of the tow cycle will be referred to as the "principal rider"; (c) the riders or passengers of a bicycle trailer, who may be adults or children, will be referred to as "passenger(s)", a "child" or "children"; and (d) the tow bicycle in combination with the bicycle trailer will collectively be referred to as the "combined cycle".

There are at least three types of trailer designs known in the art, which enable adults to tow one or more children behind a bicycle. These include (a) buggy trailers, (b) upright trailer cycles, and (c) exercise trailers. Some of the pros and cons of each type are discussed below.

Buggy trailers (FIG. 16) generally comprise a seat or compartment supported by wheels on either side and boom or other means to secure the trailer to a tow cycle in front. Buggy trailers usually offer a safety restraint, a sitting passenger position, and stability provided by the wide track of a two-wheeled design.

However, the very wide width or track of the side by side two wheel design that gives it a high degree of straight line stability also presents several problems or issues. First, many sidewalks and paths cannot accommodate the buggy trailer as they are not wide enough. Even if the sidewalk or path is wider than the track of the trailer, it may not be wide enough to facilitate pedestrians and bicyclists coming from an opposite direction to easily pass. Secondly, buggy trailers hinder the emergency maneuverability of the combined cycle. Rapid turns or lane changes can cause the trailer to tip up onto one wheel possibly taking the tow cycle with it. Further, the two additional wheels greatly increase rolling friction and the wide stance increases the aerodynamic drag of the combined cycle lowering the cycle's overall efficiency and potential speed. Since children typically cannot participate in propulsion, buggy trailers require additional energy output from the principle rider making them even more difficult to tow. Finally, because of their lack of participation in the combined cycle's propulsion, children and other passengers may quickly become bored and as such only tolerate these types of trailers for short durations, limiting the distance that the principal rider can travel.

Another commercially available trailer, the upright trailer cycle 12 & 14 (FIGS. 14 and 15), has a single rear wheel and allows a principal rider to tow one or two children who can contribute to propulsion of the combined cycle.

While allowing passengers to participate in propulsion, upright trailer cycles 12 & 14 usually lack safety restraints to secure the child to the trailer, making them less suitable for use with younger children. The upright position does not easily allow the child to rest comfortably while being towed for extended durations. Use of an upright trailer cycle requires the passenger to focus on the terrain and the principal rider's direction of travel to prevent falling off the trailer cycle, due to unexpected turns or travel over uneven surfaces. To be operated safely, upright trailer cycles generally require the child to interface with the trailer bicycle at three points while riding: 1) hands on the handlebars, 2) buttocks on the saddle, and 3) feet on the pedals. Should the child remove his or her hands, buttocks, or feet from the trailer bicycle, the child increases their risk of becoming separated from the trailer bicycle in the event that the principal rider unexpectedly changes direction or travels over an uneven surface.

Upright trailer cycles are not designed to minimize forces transferred from the trailer to the tow cycle and as such allow significant forces to be transferred from the trailer to the tow cycle. Consequently, passengers on an upright trailer cycle can often override the control of the principal rider. Forces from the passenger's body movements, even pedaling motion, may result in unpredictable control of the tow cycle which can potentially lead to accidents.

It should be noted that children, while on trailers, are known to unpredictably exert forces perpendicular to the direction of travel by quickly moving their bodies to turn and view passing objects, or to excitedly move side-to-side to look around the tow cycle. Two children on a trailer exert additional side-to-side force and often behave more unpredictably due to their interaction with each other. Prior art trailer cycles having the benefit of a single rear wheel are not designed to minimize the transfer of these side-to-side forces from the trailer to the tow cycle.

At least one company unsuccessfully provided a two-passenger, upright trailer bicycle 14 (Reference FIG. 15). The two-person, upright trailer bicycle was sold in 1998 for about one year. This two-passenger, upright trailer cycle multiplied the unstable nature of the device and in studies even a skilled cyclist was unable to safely control the two-passenger upright trailer cycle. Consequently, production of the two-passenger upright trailer cycle was discontinued, reinforcing its inoperability. After nearly a decade, the two-passenger upright-type trailer cycle has been reintroduced to the market. The product is experiencing insignificant sales as retailers are familiar with the safety concerns associated with the cycle's unpredictable handling characteristics.

The exercise trailer in U.S. Pat. No. 5,269,548, to Milligan, is intended to provide exercise to the handicapped. The design employs a wide, two-wheeled configuration with a passenger resting between the rear wheels. This configuration is relatively complex to fabricate and does not support the conve-

BRIEF DESCRIPTION OF DRAWINGS

FIG. 2 is a top view of the single passenger recumbent bicycle trailer according to one embodiment of the present invention.

FIG. 3 is a bottom view of the single passenger recumbent bicycle trailer according to one embodiment of the present invention.

FIG. 4 is a rear view of the single passenger recumbent bicycle trailer according to one embodiment of the present invention.

FIG. 9 is an isometric of a chainguard as used with the recumbent trailer according to one embodiment of the present invention.

FIG. 10 is an isometric of a rear fender as used with the recumbent trailer according to one embodiment of the present invention.

FIG. 11 is an isometric of a front fender as used with the recumbent trailer according to one embodiment of the present invention.

FIG. 12 compares the steering axis and steering wheel axis of an automobile with the axis of a bicycle and an associated prior art upright trailer.

FIG. 13 compares the steering axis and steering wheel axis of a hypothetical automobile with the axis of a bicycle and an associated recumbent trailer according to one embodiment of the present invention.

DETAILED DESCRIPTION

Figure 1:
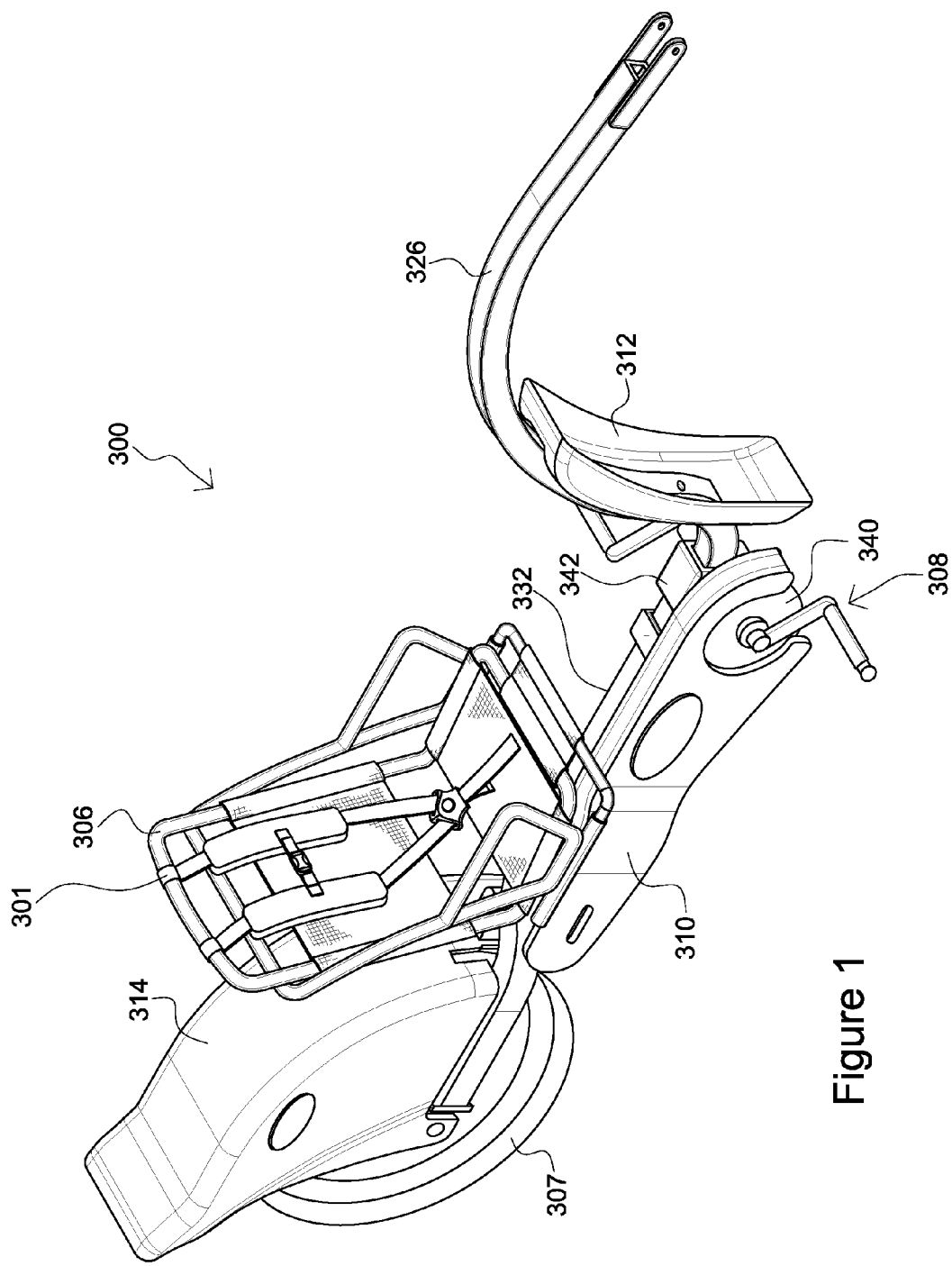
FIG. 1 is an isometric view of a single passenger recumbent bicycle trailer according to one embodiment of the present invention.

Embodiments of the present invention comprise a single-wheeled recumbent bicycle trailer that may be attached to a bicycle for transport of a passenger or passengers wherein the passengers may contribute to propulsion of the combined cycle. The embodiments include a recumbent seating position and other accommodations for the safety and comfort of passenger(s) and ease of use. Such accommodations may include single or multi-passenger configuration, passenger pedals, hands-free operation for passengers, supportive seats with backrests, extendable leg rests, and safety restraints. Embodiments of the trailer are configured to overcome one or more of the disadvantages of prior art resulting in a trailer that permits passengers, more particularly children, to be towed safely while also permitting the passenger to participate in the propulsion of the combined vehicle.

To safely tow a child on a trailer cycle, the principal rider must have predictable control of the combined tow cycle and trailer. Embodiments described herein reduce the undesirable forces transferred from the trailer to the tow cycle by both lowering the center of gravity of the tow cycle and decoupling steering input from the trailer to the cycle. This assists in preventing passengers from negatively affecting, through their lateral (relative to the direction of travel) body movements, the principal rider's control over the combined cycle.

FIG. 12 compares a simplified steering system 105 from an automobile 100 to a prior art upright trailer cycle 12. This automobile's steering configuration, in which the center of the steering wheel (or steering wheel axis 115) is located on the longitudinal axis 120 of the steering column, maximizes the driver's ability to change the direction of the vehicle through rotational force exerted on the steering wheel. Analogously, the trailer cycle has a handlebar 130 on the about the same longitudinal axis 135 & 140 as the tow cycle handlebar 145. It is obvious that the trailer passenger and principal rider both have the equivalent of steering wheels on the same longitudinal axis 135 & 140. The consequence of this design is that the principal rider partially surrenders control of the tow cycle to the passenger. By exerting rotational forces at the handlebar, the passenger overrides or at least significantly impacts the principal rider's control and can effect dramatic and sudden changes in direction of travel. These forces are particularly noticeable and dangerous in a two-passenger configuration 14 of an upright trailer cycle.

FIG. 13 compares a fictitious steering system 205 for an automobile to an embodiment of a recumbent trailer cycle 210. This fictitious configuration, wherein the steering wheel as indicated by the steering wheel axis 215 is mounted non-rotatably to an extension mounted perpendicularly to the steering column axis 220, offsets the center of the steering wheel from the longitudinal axis of the steering column. In this configuration, rotational force applied to the steering wheel is not transferred to the steering column. Consequently, the automobile cannot be controlled by rotating the steering wheel. To control the automobile, the steering wheel must be pushed side-to-side. Analogously, by separating the trailer and tow cycle axes of rotation 240 & 235 respectively, rotational forces exerted on the recumbent trailer cycle are not transferred to the tow cycle. On the recumbent trailer cycle, passenger's point of control is on an entirely separate longitudinal axis. Stability and control of the embodiments described herein in combination with a tow cycle are also improved because the principal rider gains mechanical advantage over the passenger(s) because the principal rider's longitudinal axis is farther from the ground than the passenger's longitudinal axis.

The optimal design for the trailer cycle exploits mechanics discussed relative to FIGS. 12 and 13. For the safest, most controllable ride quality, the vertical separation between the tow and trailer cycle's longitudinal axes is increased and maximized. Embodiments of the recumbent trailer cycle maximize the separation between trailer cycle's longitudinal axis and the longitudinal cycle axis of a suitable tow cycle. Further, the center of gravity of the trailer cycle when loaded is lower than the tow cycle with a rider thereon. Advantageously, the present design provides both the dynamic stability of the two-wheeled trailer while also providing the greater mechanical efficiencies of a one-wheeled trailer.

Embodiments of the recumbent trailer cycle minimize the undesirable forces transferred from the trailer to an attached tow cycle. This prevents the trailer cycle passenger from overriding the principal rider's control of the combined cycle through their intentional or even inadvertent side-to-side body movement. In testing, embodiments of the recumbent trailer cycle were stable enough that the principal rider of an attached tow cycle could control the combined cycle while riding with only one hand. Through this improved stability, the recumbent trailer cycle solves the prior inoperability of the trailer cycle two-passenger configuration.

Embodiments of the recumbent trailer cycle also allow passengers to more significantly participate in propulsion. In pedaling the trailer cycle, a passenger pushes against the seat's back rest and exerts more force than compared to prior art upright trailer cycles. In testing, a passenger of an embodiment coupled to a tow cycle was able propel the principal rider at significant speed without the principal rider's assistance. As a further advantage, embodiments of the recumbent trailer cycle position the passenger close to the ground which allows the passenger, who is often a child, to easily mount and dismount.

The fully supporting seat of embodiments accommodates safety restraints to secure passengers to the recumbent trailer cycle. This allows younger children not yet prepared to ride unsecured on a prior art upright trailer cycle, to participate in cycling. Because of the safety restraints, passenger do not have to pay attention for sudden changes in the direction of travel which could throw or dislodge them from a prior art upright cycle. Rather, passengers can pedal, entertain themselves, rest, and even fall asleep while traveling.

The fully supporting seats of at least some embodiments provide comfort and prolong the duration that passengers enjoy riding. Seats can provide pockets for storing objects allowing passengers to entertain themselves with toys, books, electronics, and refreshments. Further in at least one embodiment, the proper leg extension for various size riders is accomplished with a single adjustment, fore and aft seat position.

Unlike prior art buggy trailers, which are typically partially or fully enclosed, the passengers in embodiments of the present invention have unobstructed views and improved experience which acts to increase the duration in which passengers, especially younger ones, are willing to travel in the trailer.

Embodiments of the trailer cycle are of the recumbent-type meaning that the rider/passenger sits within the trailer in a generally sitting or even supine position as opposed to an upright orientation as is common on conventional bicycles and prior art upright trailer cycles. This design avoids the use of standard bicycle saddles which can cause passengers discomfort. Rather, fully supportive seats are provided that minimize side-to-side passenger movement improving efficiency and stability of the combined cycle. The comfort and convenience of the passenger(s) is also improved. Passengers are able to ride hands free and entertain themselves with food, water and toys, and books. Passengers can even fall asleep in the seats during extended rides.

Embodiments of the recumbent trailer cycle also require less fabrication than prior art upright trailers. In contrast to prior art upright trailer cycles, which use multiple triangulated frame members to elevate the passenger above the cranks, embodiments of the present invention comprise single or two-piece elongated frame members. Further, they are less expensive to produce than prior art buggy-style trailers that require at least two rear wheels and if a pedaling means is to be provided, the propulsion means is relatively complex. As an added advantage, the track of the embodiments is similar if not the same as that of the tow cycle overcoming the width problem associated with prior art buggy-style trailers.

Ultimately, embodiments of a recumbent trailer cycle provide the opportunity for children of many ages to participate safely in cycling and to travel greater distances in comfort than they would propelling their own bicycle or as passengers of prior art trailers.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, tense or any singular or plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation.

The term "integrate" or "integrated" as used in this specification and the appended claims refers to a blending, uniting, or incorporation of the identified elements, components or objects into a unified whole.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

An Embodiment of a Recumbent Trailer

An embodiment of a single passenger recumbent trailer cycle 300 illustrated in FIGS. 1-4 & 6, the primary elements of the trailer generally from front to rear include: (i) a hitch 302 (see FIG. 6) for attaching the recumbent trailer cycle to a tow cycle; (ii) a frame assembly 304; (iii) an adjustable seat assembly 306; (iv) a single rear wheel 307; and (v) a drivetrain assembly 308. Other components of a typical recumbent cycle include a chain guard 310 and front and rear fenders 312 & 314.

Figure 6:
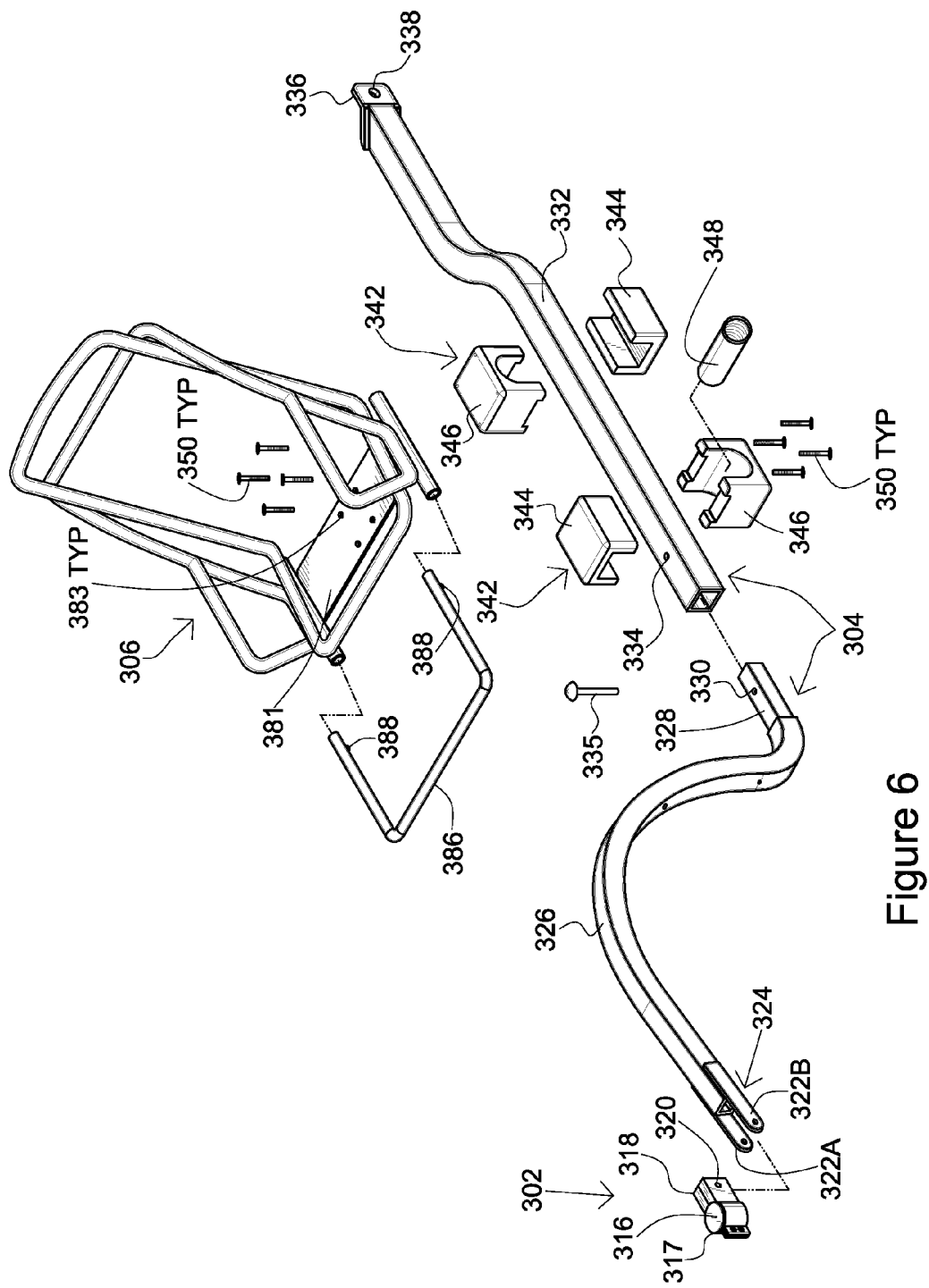
FIG. 6 is a partial exploded isometric view of a single passenger recumbent bicycle trailer according to one embodiment of the present invention.

A trailer hitch 302 configured for attachment to a seatpost of a tow cycle is illustrated in FIG. 6. The illustrated hitch is exemplary only as many suitable hitch configurations and designs are suitable for use with embodiments of the recumbent trailer. A hitch or hitch assembly typically performs the following functions: (i) it transfers propulsive energy between the trailer and the tow cycle to equalize the velocity of both; (ii) it permits the trailer to pivot laterally relative to the tow cycle permitting the combined cycle to more easily turn around corners; and (iii) it resists the side to side tilting of the trailer relative to the tow cycle.

The illustrated hitch includes left and right halves typically made from a metallic material, such as aluminum or steel, that when joined and bolted together form a seatpost bore 316 through which a seatpost of the tow cycle is slidably received. In some variations, a plastic cylindrical bushing 317 may be provided between the interior surface of the seatpost bore and the exterior surface of the seatpost to facilitate both slidable movement of the hitch both pivotally about the post's longitudinal axis and upwardly and downwardly along the post. Further, the bushing helps deaden or attenuate any sound that would otherwise result from a metallic seatpost clanging against a metallic hitch.

The portion of the hitch 302 opposite the seatpost bore 316 when the halves are joined together comprises a tongue 318 with a laterally and horizontally extending attachment bore 320 extending therethrough. The tongue is received between the spaced arms 322A&B of a yoke 324 at the trailer's anterior end. A quick release pin or bolt (not shown) is received through a first arm 322A, the hitch's tongue portion and the opposing and aligned second arm 322B and secured to join the rest of the trailer to the hitch. The horizontal attitude of the pin or bolt permits the trailer to pivot upwardly and downwardly relative to the tow cycle to help the combined cycle more aptly navigate over uneven terrain.

The frame assembly 304 essentially comprises two elongated tubular sections 326 & 332 typically having square or rectangular cross sections. The tubular sections can be comprised of any suitable material but in at least one variation the sections comprise 1.5" square tube in 14 gauge steel. In other variations, the size, cross sectional geometry, thickness and material can vary. In yet other variations the elongated sections can comprise non-tubular beams such as but not limited to C-channel and I-beam channel.

Referring to FIG. 6, the two spaced and parallel plates 322A&B forming the yoke 324 are typically welded, bolted or otherwise affixed to the generally vertical sides of the tubing of the front frame section 326 at its proximal or anterior end. In variations of the trailer having differently configured hitch assemblies, the design and configuration of the yoke may vary as well.

The tubing of the front frame section is generally S-shaped. A front arcuate portion extends from the generally horizontal orientation at its proximal end to a generally vertical orientation wherein it transitions into an opposite facing rear arcuate portion with a significantly smaller radius. The larger arcuate front portion is configured to extend from the seatpost hitch connection and over and behind the rear wheel of a tow cycle as well as below the axle of the rear wheel. Accordingly, the radius the arc is greater than that of the radius of a rear wheel of a tow cycle that the trailer is designed to interface with. Further, the curved front portion generally parallels the circumference of an associated tow cycle's rear wheel. Effectively, the larger arcuate portion acts to vertically separate the longitudinal axes of the tow and trailer cycles providing the tow cycle with a mechanical advantage over the trailer cycle.

Referring to FIG. 1 and FIG. 11, in some embodiments a front fender 312 may be secured to the inside surface of the arcuate front portion effectively shielding a passenger of the trailer from road spray and debris that could be projected from the rear wheel. The fender is typically comprised of a suitably impact resistant plastic but other materials such as sheet steel or aluminum can be utilized as well.

Referring again back to FIG. 6, the smaller arcuate rear portion of the front frame section 326 terminates at a distal end that extends substantially horizontally rearwardly. The distal end as shown comprises a smaller section 328 of square tubing that is coupled to the larger diameter tubing by any suitable means, such as welding. The smaller square tubing is configured to be snuggly received in the interior of the rear frame section's proximal end to securely join the sections together. Once the front and rear frame sections 326 & 332 are slid together, the bores 330 & 334 extending through the respective portions of each frame section become aligned and a bolt or cotter pin (not shown) is placed therethrough and secured. It is to be appreciated that other means and mechanisms to couple the front and rear frame sections are contemplated; however, variations of the illustrated mechanism wherein a front or rear portion matingly slides into a corresponding rear or front portion are both simple and very effective. Furthermore, by removing the pin the front frame portion 326 can be removed from the remainder of the trailer making it more compact for ease of shipping, storage and portability.

The rear frame section 332 is also best illustrated in FIG. 6. It extends substantially linearly from its proximal end rearwardly for the majority of its length defining a primary longitudinal axis of the frame. At the end of the linear portion, it jogs to the left through a relatively tight s-curve and continues in a second linear portion substantially parallel to the first linear portion until terminating at its distal end in an axle plate 336 (or dropout) with an axle bore 338 running therethough perpendicular to the axes of the linear portions. The lateral distance of the s-curve jog is sufficient such that when a rear wheel is rotatably attached to the axle plate, it is substantially in alignment with the first linear portion and the primary longitudinal axis.

Figures 7A, 7B, 7C, 7D:
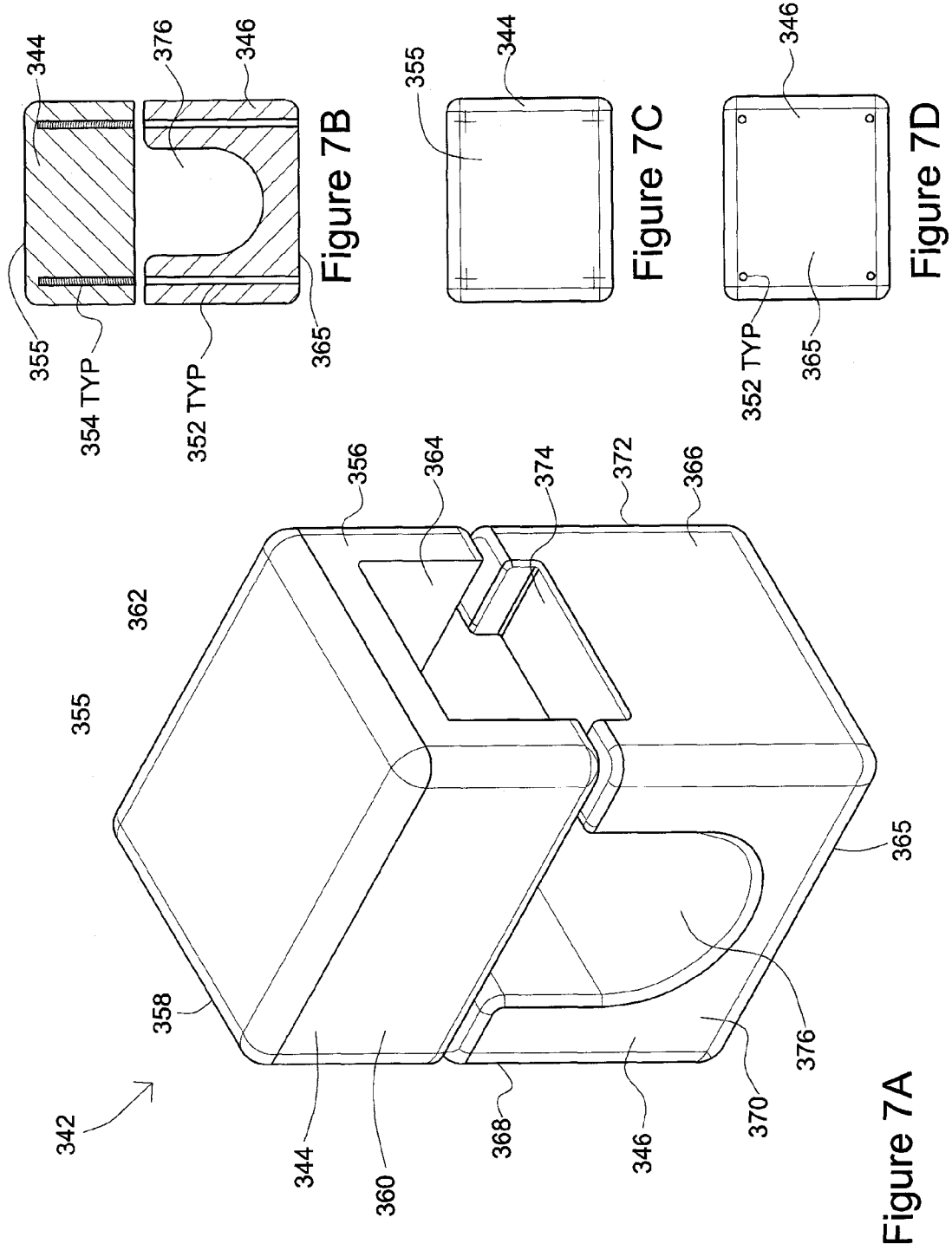
FIGS. 7A-D are various views of clamps used in various embodiments of the recumbent trailer to attach seats and or cranksets to the trailer's frame.

To couple both the seat assembly 306 and the crankset 340 of the drivetrain assembly 308 to the rear frame section 332, a universal attachment clamp assembly 342 is utilized as is illustrated in FIGS. 7A-C. Referring to FIG. 6, when the clamp is orientated in a first position with the squat top half 344 mounted on top of the frame 332, the clamp is adapted to hold a bottom bracket shell 348 in to which a typical well known bottom bracket axle and bearing assembly (not shown) of a crankset is received. Conversely, when the top half is mounted underneath the frame and the taller bottom half 346 is mounted above the frame, the clamp is adapted to couple the seat assembly to the frame.

Referring back to FIGS. 7A-C, the clamp assembly, which includes the aforementioned top and bottom pieces 344 & 346 along with four threaded bolts 350 (see FIG. 6), can be made of any suitable material but is typically comprised of an aluminum or steel alloy. The top and bottom halves are rectangularly shaped and are joined together by the four bolts which extend vertically thorough vertically extending bores 352 in the bottom half and into threaded bores 354 in the top half. The bores of both halves are located proximate the corners of the respective half.

The top half 344 has a top side 355, a front side 356, a parallel backside 358 intersecting with parallel left and right sides 360 & 362. Most significantly, a channel 364 extends through the top half from the front side through to the back side. The channel has two vertically-extending linear sides joined by a substantially linear horizontally-extending side at a top end thereof. In variations of the clamp assembly to be used with the 1.5" square rear frame section 332, the distance between the two vertical sides is at least 1.5" so that it can receive the tubular frame member therein. The depth of the channel in the variations designed to be used with the 1.5" square frame is about 1.13-1.25".

The bottom half 344 also has a top side 365, a front side 366, a parallel backside 368 intersecting with parallel left and right sides 370 & 372. It also includes a channel 374 that aligns with the top half channel and extends from the front to the back sides in a similar manner as the channel in the top half. However, the depth of the bottom half channel is typically much less than that of its top half counterpart: about 0.25" on a variation adapted for use with 1.5" square frame tube members. Of note, the combined depths of the channels of both halves is typically slightly less than the 1.5" side of the frame tubing. This is to permit the top and bottom halves to bolt securely around the frame tube without bottoming out against one another.

The bottom half, which typically has a greater overall depth than the top half also includes a U-shaped channel 376 that extends through the half from the left side 370 to the right side 372. The distance between the vertically-extending sides of the channel and the radius of the semi-circular base is about 1.60". It is configured to receive a bottom bracket shell 348 therein such that when the clamp is secured in place on the frame, the shell is also frictionally clamped in place between a bottom side of the frame tube and the semi-circular base side of the channel. As mentioned above, a standard bottom bracket assembly can then be fitted into the bottom bracket shell.

As can best be seen in FIGS. 2 & 3, the bottom bracket shell 348 is typically much wider (about 3") than the clamp assembly 34. Accordingly, the shell can be slid left or right as necessary to align the crankset with the freewheel prior to tightening the clamp in place.

As mentioned above, the top side 365 of the bottom half includes the opening for the four vertically-extending bores 352. Accordingly, when the bottom half is placed on the top of the frame as shown in FIG. 6, the aforementioned bolts can be threaded through the seat assembly 306 and the bottom half 346 and into the threaded bores of the of bottom half 344 to secure the seat to the frame. Of important note, by loosening the bolts 350 the seat assembly can be slid back or forth on the frame to adjust the length between it and the pedals 378 (mounted to the crankset 340) for passengers of different sizes. Similarly, by loosening the four bolts on the clamp assembly used to hold the crankset in place the crankset can be moved longitudinally to adjust chain 380 tension.

Concerning the clamp assembly 342, numerous variations are contemplated. It is to be appreciated that the design and configuration of the clamps can vary depending on the size and configuration of the frame sections, the manner in which the crankset is secured, and the design of the seat assembly while maintaining the advantageous features described herein. Further, it is appreciated that clamp assemblies of different designs can be used for attaching the seat assembly and crankset assembly respectively in variations of the recumbent trailer. For instance, a clamp is contemplated that does away with the need for a bottom bracket shell and instead is threaded itself to permit a bearing and axle assembly of a crankset to be directly installed in the clamp.

Figure 8:
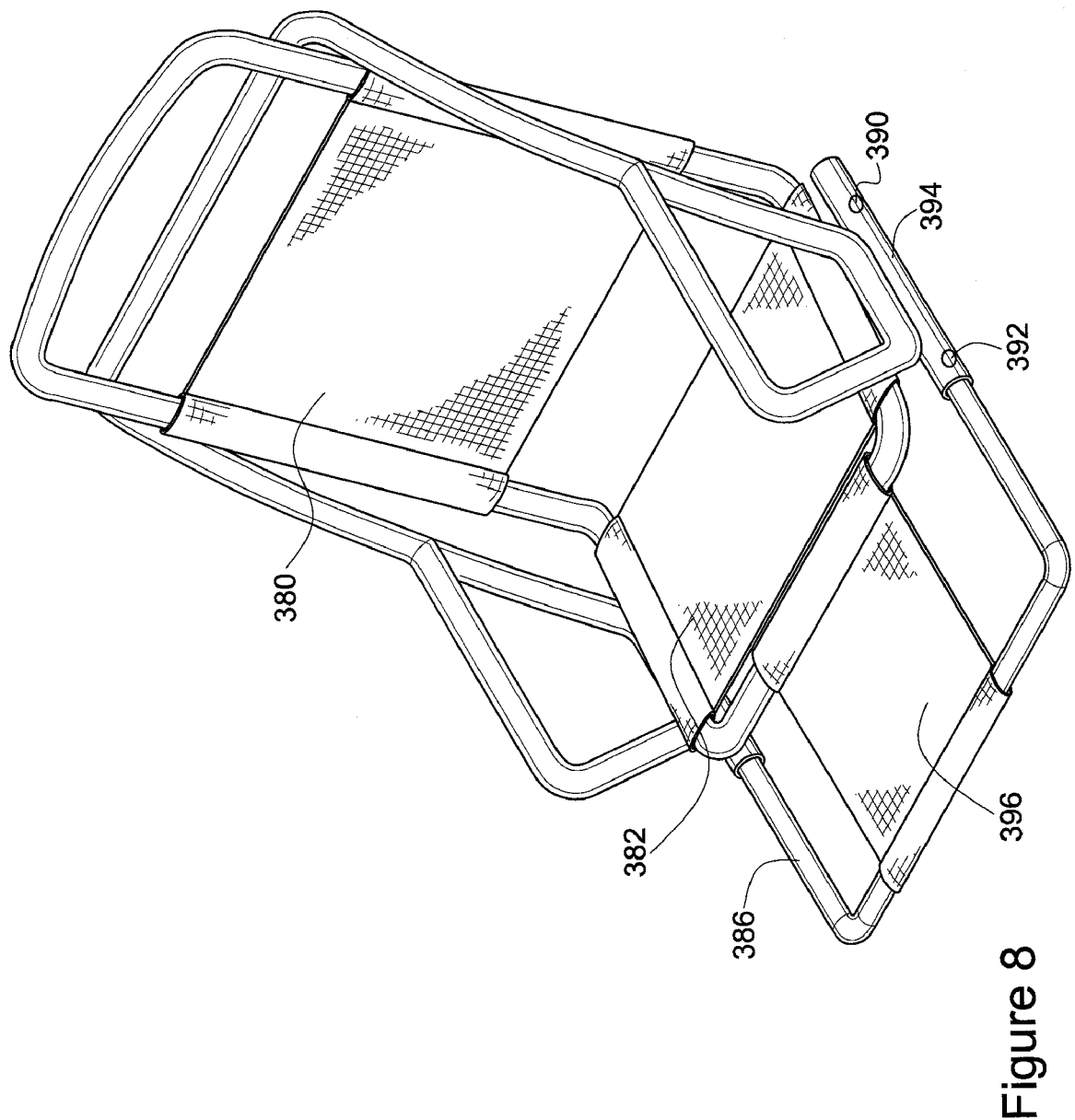
FIG. 8 is an isometric view of a seat and its associated seat extension/leg rest as used with the recumbent trailer according to one embodiment of the present invention.
Figure 14:
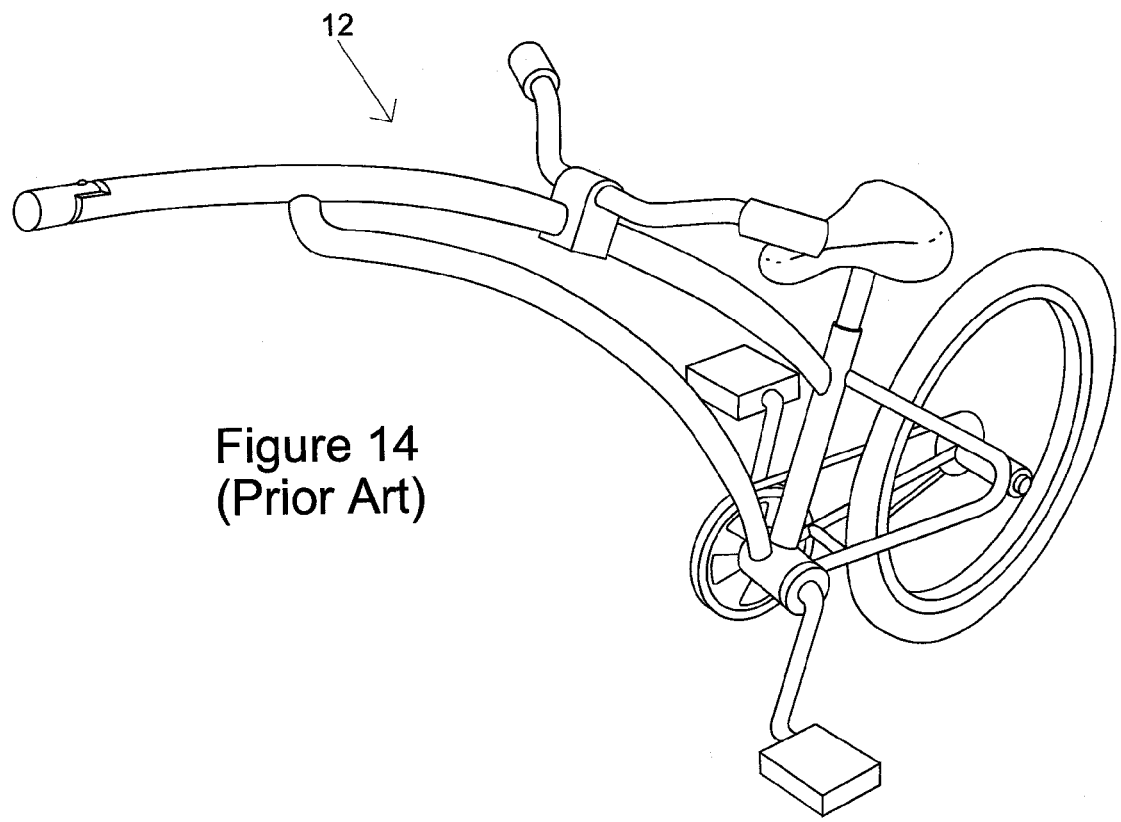
FIG. 14 is an illustration of a prior art upright passenger trailer.
Figure 15:
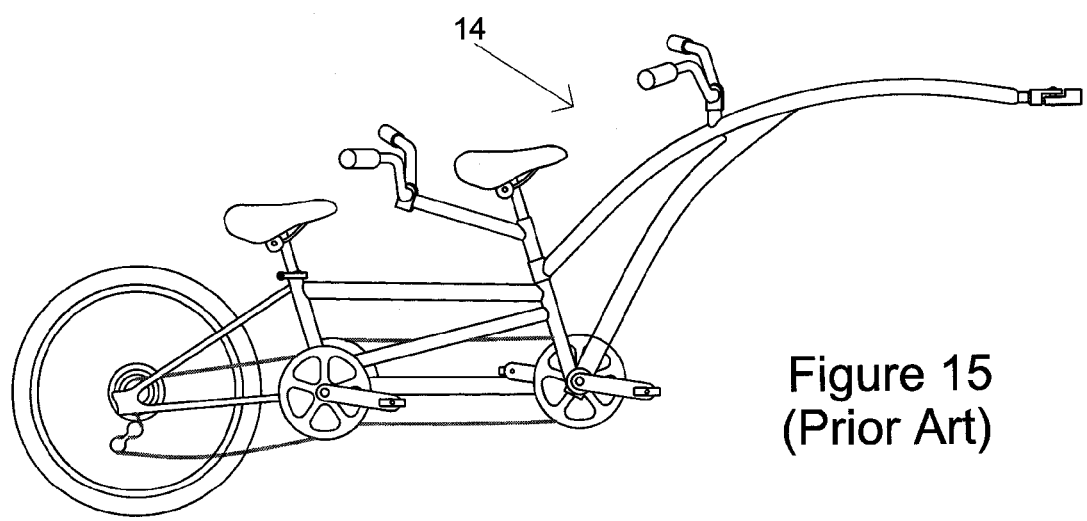
FIG. 15 is an illustration of a prior art upright two passenger trailer.
Figure 16:
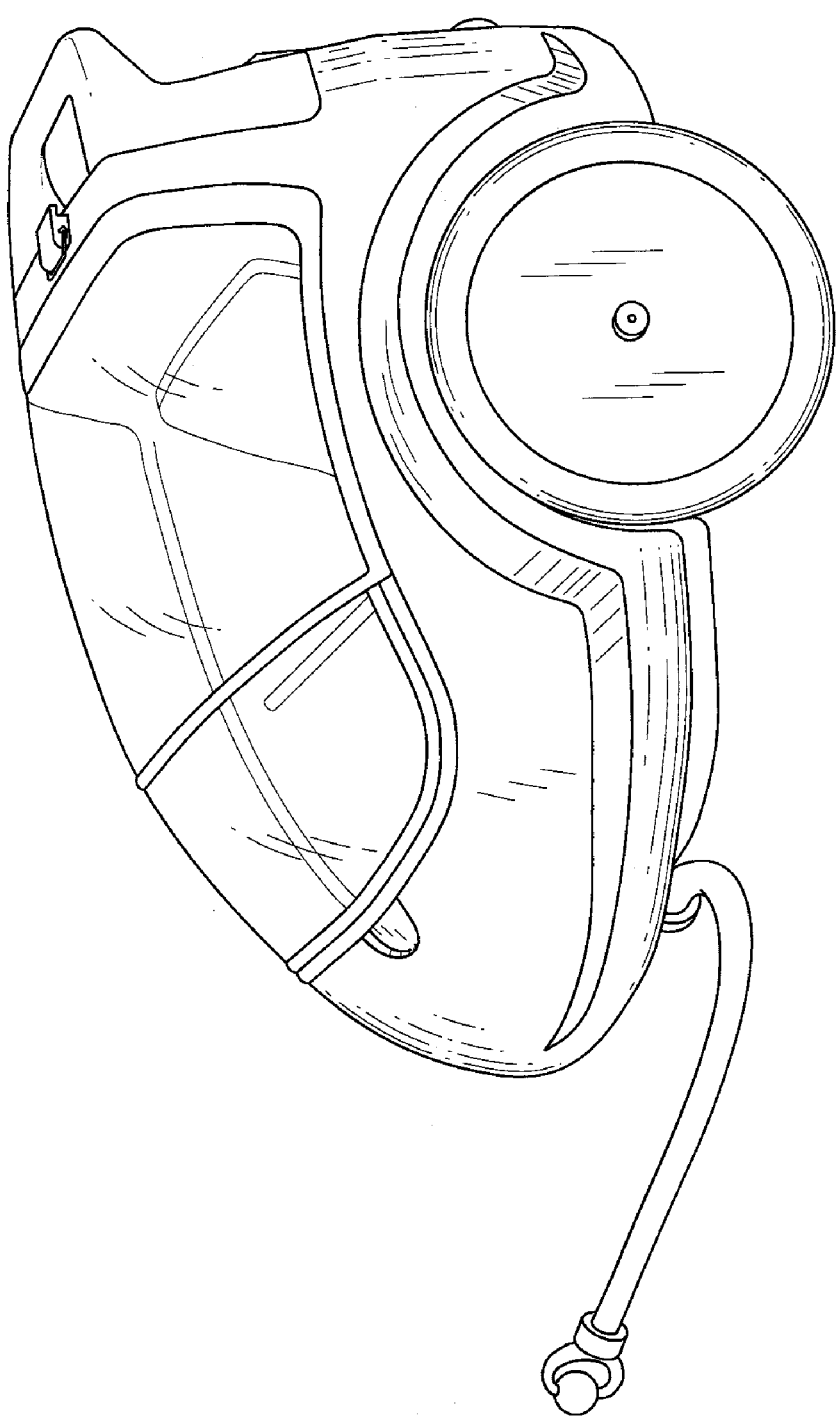
FIG. 16 is an illustration of a prior art buggy-style passenger trailer.

The seat assembly 306 is best illustrated in FIGS. 6 and 8. One embodiment of the seat is constructed of tubular aluminum framework over which fabric cover(s) 380 & 382 are suspended to serve as seating surfaces. The seat assembly includes a plate 381 that is affixed to and extends between spaced longitudinally extending tubes. The plate includes four bores 383 that align with the bores 352 in the clamp assembly 342 through which four bolts 350 are received into the clamp assembly to secure the seat to the frame 304. As shown in FIG. 1, a safety restraint 301 may also be provided to secure the passenger therein.

The seat assembly further includes an extension bar 386 that can be extended outwardly of the seat's base and locked in place to permit a passenger to stretch his her legs above the crankset 340 when the passenger is not interested in participating in the propulsion of the combined cycle. The extension arm comprises a generally unshaped tube, typically aluminum, that includes a pair of spring pins 388 located proximate the distal end of the bar's legs. The pins interface with corresponding openings 390 & 392 (shown as being on the side in FIG. 8 for convenience but they can also be downwardly facing) in the longitudinally and horizontally extending seat base members 394. The rearward or distal set of openings 390 correspond to the seat extension being in its retracted and locked position wherein a passenger can freely participate in the propulsion of the cycle by pedaling.

The forward or proximal set of openings 392 correspond to the extension being in its extended position when the spring pins 388 are received therein. In this position, a cloth cover 396, typically made of nylon, that is secured at one end to the frame of the seat and around the base of the extension is pulled taut. When the seat extension is retracted, the cloth cover folds and hangs generally underneath the seat above the frame.

While the illustrated seat assembly primarily comprises an aluminum tubular frame with nylon fabric seating surfaces, it is appreciated that different seat configurations can be utilized in various embodiments. For instance, although the seat is illustrated as having a substantially rigid back, it can be configured with a back that folds down onto the seat base to make the trailer more compact for storage. In other variations, the seat can be molded from plastic or a fiberglass or carbon fiber composite. The seat can also be comprised of stamped metal. Furthermore, some seats may incorporate a seat extension that is easily retractable such as the illustrated variation but other seats my not include the extension or may have an extension of a substantially different design. The seat may also include storage pockets and drink holders as would be obvious to one of ordinary skill in the art given the benefit of this disclosure. In yet other variations, the fabric seating surfaces may be removable to facilitate easy washing or replacement.

The drivetrain assembly 308 of embodiments of the recumbent cycle is fairly typical when compared to drivetrains found on bicycles. At the front or proximal end of the trailer, the drivetrain comprises a crankset assembly 340. The crankset assembly is rotatably coupled to the frame 304 through a universal bracket 342 as described above. A pair of pedals 378 are secured to the crankset's crankarms through which a passenger interfaces with the drivetrain. A chain 380 is received over a chainwheel of the crankset and extends rearwardly and is received around a cog (not specifically illustrated) that is attached to the axle 400 of the rear wheel 307. Sprung or unsprung idler sprockets (not shown) may be provided along the length of the chain to take up chain slack. The rear cog is typically of the freewheel type so that the passenger is not compelled to pedal and may coast as desired.

The rear wheel 307 is generally similar to a typical bicycle wheel with a few notable exceptions. As illustrated, the frame has a single dropout 336 and the wheel mounts to the single dropout on one side of the wheel's hub instead of being sandwiched between two aligned dropouts. Accordingly, the wheel's hub and associated axle are designed to take the more significant loads that typically result from a single-sided attachment. Most notably, the axle and hub are larger and more stout than found on a hub of a wheel that is fit between two aligned dropouts.

Other embodiments of the recumbent trailer include a rear frame member that includes another arm that forks out from the rear frame portion's s-curve and terminates in a second axle plate or dropout. It is appreciated that in such a version that the axle bore 338 is replaced with a slot that permits the wheel to be slid off and on the frame.

Numerous variations in the drivetrain are possible. The embodiment illustrated herein has a single speed drivetrain; however, variations are contemplated with multiple speeds using multiple cog freewheels, multiple chain wheel cranksets and front and rear derailleurs as applicable. In yet other variations, a chain based drivetrain can be replaced with drive trains using other types of energy transfer means including a belt driven drivetrain or even a shaft driven drivetrain as would be obvious to one of ordinary skill in the art given the benefit of this disclosure.

Referring to FIG. 1 and FIG. 11, a front fender 312 is illustrated. As can be appreciated, a passenger sitting down low in a recumbent position is going to more susceptible to being hit with debris, water and dirt thrown up by the tow cycle's rear wheel. The arcuate front frame member 326 which in the illustrated embodiment is located just behind the rear wheel will act to deflect much of the debris early in its trajectory; however, some particulate and spray may still get by. Accordingly, on some embodiments the front fender is provided.

The illustrated fender is typically comprised of a polymeric material that can withstand the impact of larger pieces of debris while deflecting almost all debris that is thrown off of the tow cycle's rear tire and prevent it from impacting the trailer's passenger. The polymeric material in variations may be partially reinforced with fiberglass or other suitable fillers. Furthermore variations of this fender and the rear fender and chainguard described below can also be comprised of other suitable materials, such as steel or aluminum alloys. Typically, the fender is mounted to the underside of the front frame member with one or more threaded bolts or screws.

Similarly, a rear fender 314 as illustrated in FIG. 10 is provided to protect the riders back from debris, most typically water spray from wet road and puddles, from being thrown on to a passenger's back and head. Furthermore the fender prevents a passenger from injuring him or herself by sticking his or her arm into the rear wheel as a young and curious passenger might be inclined to do. The rear fender is also typically fabricated of an impact resistant polymeric material. The rear fender can be coupled to the framework by any suitable means, such as the illustrated bracket 404 that attached to the rear frame section 332 proximate the s-curve and extends rearwardly therefrom.

FIG. 9 is an illustration of a chainguard 310 adapted to cover the chain 380 and crankset 340 chainwheel. Like the fenders, the chainguard is typically comprised of a polymeric material. It can be molded as a single unitary piece or as several pieces that are joined together thereafter, such as through mechanical fastening or thermoplastic fusion. A pair of brackets 408 extending from the chainguard are snapped over the frame 304 and can also be fastened in place using a screw or bolt. The chainguard acts to separate the passenger's leg from the greasy and/or oily chain as well as minimize the risk that oil, grease or other debris on the chain will be ejected onto the passenger. Furthermore, the chain guards inhibits a young passenger from purposely or accidentally sticking his/her hands or legs into the chain or chainwheel.

An Embodiment of a Recumbent Trailer for Two Passengers

Figure 5:
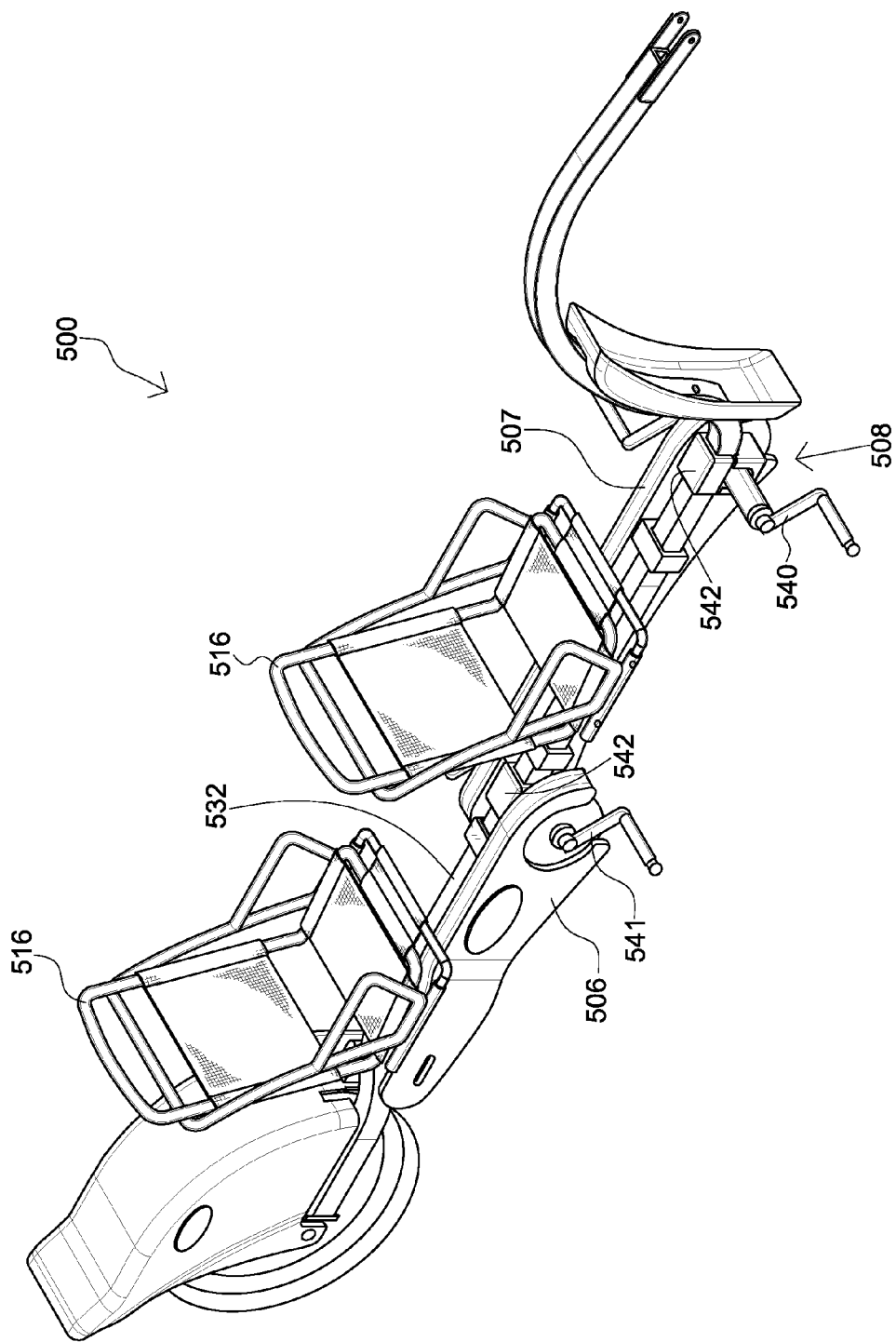
FIG. 5 is an isometric view of a double passenger recumbent bicycle trailer according to one embodiment of the present invention.

A two passenger embodiment 500 of the recumbent trailer is illustrated in FIG. 5. It is substantially similar to the one passenger embodiment except for the following differences: (i) the rear frame section 532 is longer but otherwise similarly configured; (ii) the trailer has two seat assemblies 516 mounted to the frame instead of one, although the seat assemblies themselves are substantially the same as for the single passenger embodiment; (iii) the drivetrain assembly 508 is configured for two peddlers; and (iv) there are two chainguards 506 & 507.

The rear frame section 532 is substantially similar to the rear frame section 332 of the single passenger embodiment from the s-curve back; however, its front or proximal linear portion is much longer. In one variation the linear portion of the rear frame section of the single passenger trailer is about 21" long; whereas, the two passenger rear frame section's linear portion is about 45" in length. In some variations, the cross sectional dimensions and wall thicknesses of the tubing can vary to accommodate the greater load resulting from the two passengers and the increased span between the hitch and the wheels. The extended linear section accommodates the two seats held onto the frame with two universal clamp assemblies 542 and two cranksets of the tandem drive train 508 also held in place by two universal clamps.

The drive train assembly 508 is of the style found on tandem bicycles and comprises front and rear cranksets 540 & 541. The rear crankset 541 has two chainwheels: on both the left and right sides of the frame. One chainwheel is functionally coupled by way of a synchronizing chain (not shown) to the chainwheel of the front crankset and the other chainwheel is functionally coupled the freewheel by a drive chain (also not illustrated).

In a traditional tandem drive train, both the front and rear riders must pedal in unison. This can be very difficult for children, and accordingly, in certain embodiments of the two passenger trailer, cranksets having freewheeling mechanisms functionally between the crankarms and the chainwheels can be utilized. By incorporating freewheeling mechanisms, the passengers can pedal at their own pace regardless of the pedal speed of the other passenger; however, as is obvious to one of ordinary mechanical aptitude only the passenger pedaling at the faster rate of speed will be contributing to the combined cycles propulsion. While this would be extremely undesirable in the case of a tandem bicycle, the mitigation of conflicts that could arise when two young passengers with one perhaps being older than the other are required to synchronize their pedaling speed will often more than justify the loss in propulsion energy.

The rear chainguard 506 is substantially similar to the chainguard of the single passenger embodiment. The front chainguard 507, however, is of a different configuration designed to span between and cover both the front and rear chainwheels on one side of the frame. Nevertheless, the front chainguard is fabricated from similar materials as the rear chainguard and it attaches to the frame in a substantially similar manner.

A Method of Operating a Bicycle Having a Tow Cycle Embodiment Attached Thereto While the principal rider stabilizes the combined cycle including an embodiment of a recumbent trailer cycle 300, the passenger mounts the seat 306. As necessary, the seat is adjusted longitudinally to provide the proper leg extension for the passenger by loosening the appropriate universal clamp 342 and sliding the seat forwardly or rearwardly. In some embodiments, the passenger can be secured to the seat using a safety restraint 301 especially when the passenger is a child. If the passenger is going to contribute to the combined cycle's propulsion, the passenger places his or her feet on the pedals 378 and when and after the principal rider begins pedaling, the passenger optionally begins pedaling to help propel the combined cycle. By rotating the crankset 340, the passenger turns the chain 380 and drives the freewheel and rear wheel 307.

If the passenger is uninterested or perhaps unable, such as in the case with a very small child, the telescoping seat extension 386 can be deployed so that the passenger's legs rest above the crankset 340. To deploy the extension the spring pins are simultaneously depressed in the distal rearmost openings 390 in the associated seat members and the extension is slid outwardly until the spring pins are received and automatically deploy in the forward most or proximal set of openings 392. The fabric extension cover 396 is automatically deployed and pulled generally taut when the extension is deployed.

While riding, the hitch 302 allows the tow and trailer cycles to articulate vertically as they travel over irregular terrain and horizontally through turns.

Embodiments of the recumbent trailer cycle 300 do not require a passenger handlebar although one can be provided in variations. In test on an embodiment, child passengers in tests preferred hands-free operation. While riding, passengers can play with toys, drink, eat snacks, and wave there hands in the wind. Due to the safety restraint, passengers do not need to pay attention to changes in the direction of travel.

Due to back rests, passengers are able to exert more force on the pedals 378 than on a prior art upright trailer cycle contributing more energy to the propulsion of the tow cycle. In comparison studies, passengers remained entertained for much longer durations riding in embodiments of the present invention when compared to prior art buggy trailers and upright trailer cycles. During frequent stops, passengers can and dismount the recumbent trailer cycle more easily than prior art buggy trailers and upright trailer cycles.

Other Embodiments and Variations

The embodiment of the cycle trailer and variations thereof, and method of use as illustrated in the accompanying figures and/or described above, are merely exemplary and are not meant to limit the scope of the invention. It is to be appreciated that numerous variations to the invention have been contemplated as would be obvious to one of ordinary skill in the art with the benefit of this disclosure. All variations of the invention that read upon the claims are intended and contemplated to be within the scope of the invention.

Other embodiments of this invention include but are not limited to three or more passenger variations and variations wherein two passengers facing each other with one crank. Means for joining the recumbent trailer cycle to the tow cycle include hitches mounted to either the tow cycle's seat post, rear mounted rack, rear triangle, axle, dropout, or skewer. Multiple gears can be added. Handlebars can be added. Various wheel sizes can be employed. The trailer can be chain, belt or shaft driven. Sunshades and wind fairings can be added. Seats can be nylon or plastic. The frame can be composed of many different materials and tube shapes; the chain line can be altered with pulleys, the hitch can be designed to quick release from the tow cycle, and the frame can be made folding or modular segments so it can be disassembled and converted between a one and two-passenger configuration. The trailer can also be implemented with no drive train at all.

I claim:

1. A recumbent bicycle trailer comprising:
   a frame having a primary longitudinal axis, a proximal end and a distal end;
   a hitch connected to the proximal end of the frame, the hitch adapted to couple with a tow cycle;
   only a single rear wheel having a first diameter coupled with the frame at the distal end, the rear wheel being substantially aligned with the primary longitudinal axis perpendicular to an axle of the wheel;
   at least one seat having a base and a seatback facilitating a substantially recumbent seating position for a passenger, the seat being (i) coupled above and to the frame and (ii) configured for fore and aft adjustment relative to the primary longitudinal axis; and
   a drive train assembly including at least one crankset, a freewheel operationally coupled to the rear wheel, and a energy transfer means operatively coupling the at least one crankset with the freewheel
   wherein the recumbent trailer during use is adapted to pivot laterally and vertically relative to the tow cycle.

2. The recumbent trailer of claim 1, wherein the frame comprises a front frame section and a rear frame section, the front frame section spanning between the hitch and the rear frame section, the rear frame section terminating in a single one or more dropouts.

3. The recumbent trailer of claim 2, wherein the front and rear frame sections are connected by one of a single pin or bolt.

4. The recumbent trailer of claim 1, wherein the primary longitudinal axis is generally parallel to the ground and located above the ground a distance generally equal to a radius of the single rear wheel when the trailer is coupled to a tow cycle.

5. The recumbent trailer of claim 1 further comprising at least two clamp assemblies, a first clamp assembly adjustably coupling the crankset to the rear frame section and a second clamp assembly adjustably coupling the seat to the rear frame section.

6. The recumbent trailer of claim 1, wherein the seat further comprises a selectively deployable and retractable seat extension.

7. The recumbent trailer of claim 1, wherein the at least one seat comprises two seat assemblies one of the seat assemblies mounted behind the other.

8. The recumbent trailer of claim 7, wherein the at least one crankset comprises a front crankset secured to the frame in front of the front seat and a rear crankset secured to the frame behind the front seat and in front of the rear seat.

9. A combination comprising a bicycle and the recumbent trailer of claim 1, the bicycle including front and rear wheels and a seatpost, the trailer being operatively coupled to the bicycle.

10. The combination of claim 9, wherein (i) the frame comprising a front frame section and a rear frame section, the front frame section spanning between the hitch and the rear frame section, and (ii) the front frame section is coupled to the seatpost by the hitch and curves downwardly and rearwardly from the hitch to a connection with the rear frame section behind the rear wheel of the bicycle.

11. The bicycle trailer of claim 1, wherein the seat includes a safety restraint for securing a passenger thereto.

12. The bicycle trailer of claim 1 further including a chainguard, the chainguard covering at least part of the crankset and the energy transfer means.

13. A bicycle trailer comprising:

a frame having a primary longitudinal axis and comprising a front frame section and a rear frame section, the front frame section spanning between the hitch and the rear frame section, the rear frame section terminating in one or more dropouts, the front and rear frame sections being coupled together by one of a single pin or bolt;

a hitch connected to a proximal end of the front frame section, the hitch adapted to couple with a tow cycle;

only a single rear wheel having a first diameter coupled with the rear frame section at the one or more dropouts, the rear wheel being substantially aligned with the primary longitudinal axis perpendicular to an axle of the wheel;

at least one recumbent seat having a base and a seatback facilitating a substantially recumbent seating position for a passenger, the seat including a safety restraint for securing the passenger and being (i) coupled above and to the frame and (ii) configured for fore and aft adjustment along the frame relative to the primary longitudinal axis; and a drive train assembly including at least one crankset, a freewheel operationally coupled to the rear wheel, and a chain operatively coupling the at least one crankset with the freewheel;

wherein the recumbent trailer during use is adapted to pivot laterally and vertically relative to the tow cycle.

14. A combination comprising a bicycle and the recumbent trailer of claim 13, the bicycle including front and rear wheels and a seatpost, the trailer being operatively coupled to the bicycle.

15. A combination of a bicycle and a bicycle trailer comprising:

the bicycle including front and rear wheels and a seatpost; and the bicycle trailer, the bicycle trailer including, (i) a frame having a primary longitudinal axis and comprising a front frame section and a rear frame section, the front frame section spanning between the hitch and the rear frame section, the rear frame section terminating in one or more dropouts, the front and rear frame sections being coupled together by one of a single pin or bolt, (ii) a hitch connected to a proximal end of the front frame section, the hitch being couple with a tow cycle and permitting the trailer to pivot laterally and vertically relative to the bicycle, (iii) a single rear wheel having a first diameter coupled with the rear frame section at the one or more dropouts, the rear wheel being substantially aligned with the primary longitudinal axis perpendicular to an axle of the wheel, (iv) at least one recumbent seat having a base and a seatback facilitating a substantially recumbent seating position for a passenger, the seat including a safety restraint for securing the passenger and being (a) coupled above and to the frame and (b) configured for fore and aft adjustment along the frame relative to the primary longitudinal axis, and (v) a drive train assembly including at least one crankset, a freewheel operationally coupled to the rear wheel, and a chain operatively coupling the at least one crankset with the freewheel.

* * * * *